(12) United States Patent
Yu et al.

(10) Patent No.: US 7,447,131 B2
(45) Date of Patent: Nov. 4, 2008

(54) METHOD FOR DETERMINING OPTIMUM RECORDING POWER THROUGH DETECTING WHETHER RF TOP CHANNEL SIGNAL IS CORRECT

(75) Inventors: Jin-woo Yu, Suwon-si (KR); Young-ki Byun, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 11/189,843

(22) Filed: Jul. 27, 2005

(65) Prior Publication Data

US 2006/0077836 A1    Apr. 13, 2006

(30) Foreign Application Priority Data

Oct. 8, 2004    (KR)    ............ 10-2004-0080185

(51) Int. Cl.
G11B 15/52    (2006.01)
(52) U.S. Cl. .................. 369/47.53; 369/53.27
(58) Field of Classification Search ........ None
See application file for complete search history.

(56) References Cited

U.S. PATENT DOCUMENTS

| 6,891,786 B2 * | 5/2005 | Sato ............ 369/47.53 |
| 2002/0064110 A1 * | 5/2002 | Sato ............ 369/47.53 |

FOREIGN PATENT DOCUMENTS

| JP | 8-50722 | 2/1996 |
| JP | 2003-91823 | 3/2003 |
| JP | 2003-257029 | 9/2003 |
| KR | 2002-0019638 | 3/2002 |
| KR | 2002-0038301 | 5/2002 |
| KR | 2003-0008537 | 1/2003 |
| KR | 2003-0073540 | 9/2003 |
| KR | 2004-0061203 | 7/2004 |

* cited by examiner

Primary Examiner—Paul Huber
(74) Attorney, Agent, or Firm—Staas & Halsey LLP

(57) ABSTRACT

A method for correctly determining optimum recording power through detecting whether a radio frequency (RF) top channel signal is correct, including determining a certain location for performing optimum power control (OPC) by checking a counter area in a power calibration area (PCA) in an optical recording medium, and recording an eight to fourteen modulation signal (EFM) in a test area in the PCA, performing analog/digital sampling with respect to an RF top channel signal and an RF bottom channel signal which are generated while reading test data repeatedly recorded in the PCA in regular sequence, and checking a noise level of the sampled RF top channel signal, and when the noise level of the RF top channel signal is greater than a preset reference value, determining that an error has occurred in detecting the optimum recording power to therefore abandon a certain area in the PCA wherein the OPC is being performed, and re-performing the OPC in a new area. Accordingly, by detecting whether the top channel signal is correct and re-performing the OPC when the top channel signal has an error, the optimum recording power can be more correctly determined.

16 Claims, 2 Drawing Sheets

METHOD FOR DETERMINING OPTIMUM RECORDING POWER THROUGH DETECTING WHETHER RF TOP CHANNEL SIGNAL IS CORRECT

CROSS-REFERENCE TO RELATED APPLICATION

This application claims the benefit of Korean Patent Application No. 2004-80185, filed Oct. 8, 2004, in the Korean Intellectual Property Office, the disclosure of which is incorporated herein by reference.

BACKGROUND OF THE INVENTION

1. Field of the Invention

The present invention relates to a method for correctly determining optimum recording power through detecting whether a radio frequency (RF) top channel signal is correct.

2. Description of the Related Art

Generally, optical recording media are divided, according to capability of repetitive recording, into a read-only memory (ROM), a write-once-read memory (WORM) capable of only one time of recording, and a rewritable memory (RW) capable of repetitive recording.

The ROM optical recording medium comprises a compact disc (CD)-ROM and a digital versatile disc (DVD)-ROM. The WORM optical medium includes a CD-recordable (CD-R) and a DVD-R which are both one-time recordable medium. The RW medium which can rewrite data many times includes a CD-RW and a DVD-RW.

In order to obtain high-quality optical recording, an optimum power control (OPC) process is indispensable. The OPC process is for determining an optimum recording power according to the recording medium and the discs having respectively different optical characteristics. In general, the OPC process is performed in a power calibration area (PCA) allocated beforehand on the disc according to the Orange Book which is the Trusted Computer Security Evaluation Criteria.

According to the Orange Book, a disc includes five areas depending on purposes. In other words, a disc is divided into a PCA area, a programmable memory area (PMA), a lead-in area, a data area, and a lead-out area.

In the PCA area, prior to actual data recording, test data is recorded while changing strength of a laser beam so that the optimum recording power corresponding to the disc can be determined. Usually, information on an empty CD of major manufacturers is already included in a recorder. The PMA area temporarily stores information on data being recorded before closing the disc. The lead-in area records a table of contents (TOC) which is information on recorded items. The lead-out area informs of an end of the recording. An area to the left of the data area, including the PCA area, the PMA area and the lead-in area, is referred to as an inner circumferential area, whereas an area to the right of the data area, including the lead-out area, is referred to as an outer circumferential area.

The DVD/RW is capable of recording, deleting and rewriting of data. Even in the PCA area which performs the OPC, if the PCA area is filled up with data, the data should be erased for reuse of the PCA area. Here, the PCA area may not be completely cleared due to an unstable servo and inferiority of power setting, or the data before emptying the PCA area may remain in the recording medium, thereby causing an error in the optimum recording power detected by the OPC.

Especially, the DVD/RW would have changes of spaces around a pit due to an influence of the optical power recorded before DC-erase (direct current-erase), which accordingly causes an error in the optimum recording power.

SUMMARY OF THE INVENTION

An aspect of the present invention is to solve at least the above problems and/or disadvantages and to provide at least the advantages described below. Accordingly, an aspect of the present invention is to provide a method for determining optimum recording power more correctly, through detecting whether a radio frequency (RF) top channel signal is correct.

In order to achieve the above-described aspects of the present invention, there is provided a method for correctly determining optimum recording power through detecting whether a radio frequency (RF) top channel signal is correct, including determining a certain location for performing optimum power control (OPC) by checking a counter area in a power calibration area (PCA) in an optical recording medium, and recording an eight to fourteen modulation signal (EFM) in a test area in the PCA, performing analog/digital sampling with respect to an RF channel signal and an RF bottom channel signal which are generated while reading test data repeatedly recorded in the PCA in regular sequence, and checking a noise level of the sampled RF top channel signal, and when the noise level of the RF top channel signal is greater than a preset reference value, determining that an error has occurred in detecting the optimum recording power to therefore abandon a certain area in the PCA wherein the OPC is being performed, and re-performing the OPC in a new certain area.

The method further includes when the noise level of the RF top channel signal is smaller than a preset reference value, calculating modulation based on the top and the bottom channel signals, and estimating a modulation curve through a curve fitting from the modulation; and calculating a gamma curve from the modulation curve and determining the optimum recording power using the gamma curve.

The RF top channel signal has luminosity of a highest level, among the RF signals.

The RF bottom channel signal has luminosity of a lowest level, among the RF signals.

The modulation is calculated by the following equation:

$$m = \frac{|\text{Top}| - |\text{Bottom}|}{|\text{Top}|}$$

wherein, 'm' denotes the modulation, |Top| denotes a size of the sampled top channel signal and |Bottom| denotes a size of the sampled bottom channel signal.

Additional aspects and/or advantages of the invention will be set forth in part in the description which follows and, in part, will be apparent from the description, or may be learned by practice of the invention.

BRIEF DESCRIPTION OF THE DRAWINGS

The above aspect and other features of the present invention will become more apparent by describing in detail exemplary embodiments thereof with reference to the attached drawing figures, wherein.

DETAILED DESCRIPTION OF THE PREFERRED EMBODIMENTS

Figure 1:
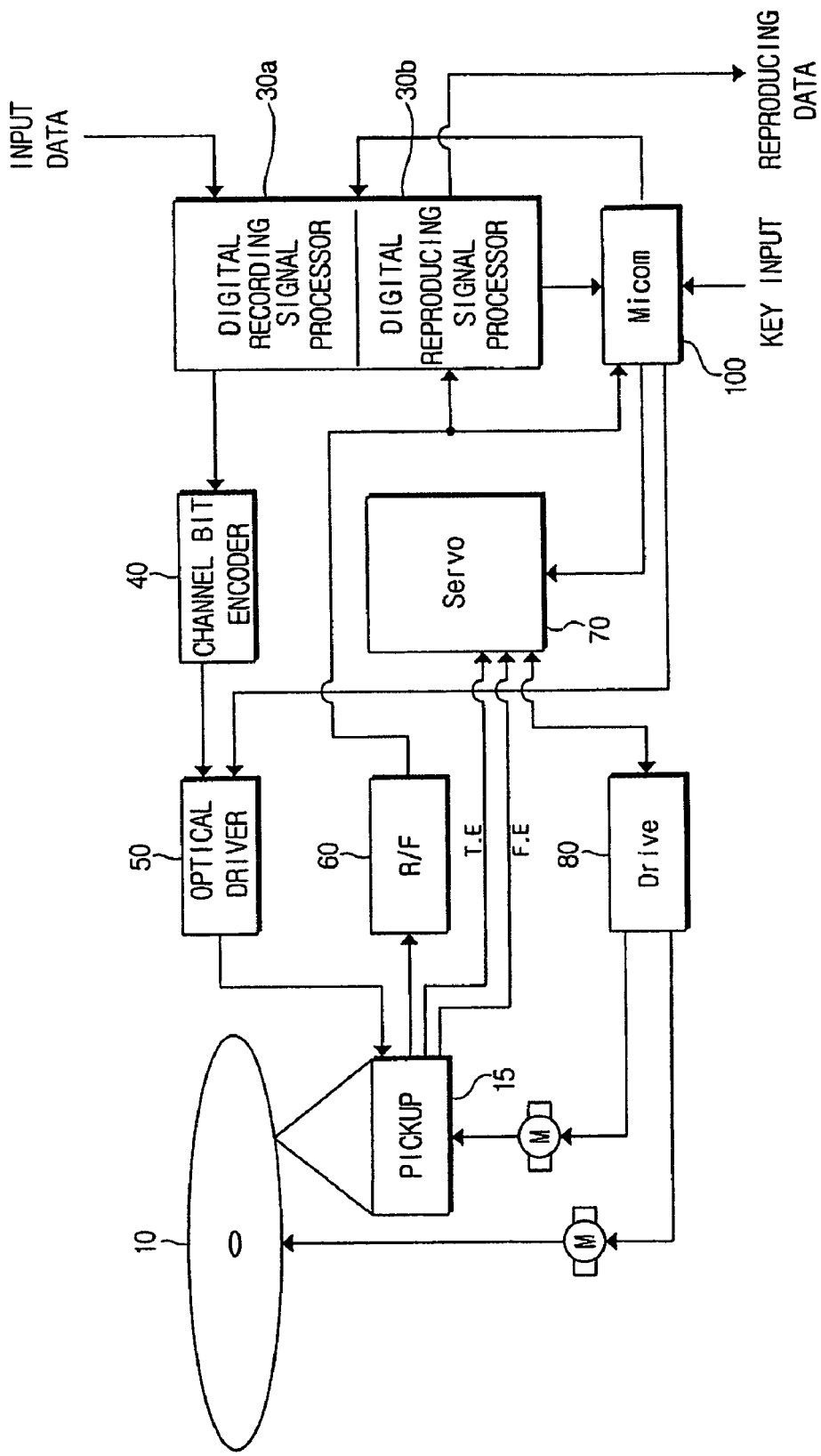
FIG. 1 is a block diagram illustrating the structure of an optical recording/reproducing apparatus according to an embodiment of the present invention.

Hereinafter, an embodiment of the present invention will be described in detail with reference to the accompanying drawing figures.

In the following description, the same drawing reference numerals are used for the same elements, even in different drawings. The subject matter provided in the description, such as the detailed construction and elements, are provided to assist in a comprehensive understanding of the invention. Thus, it is apparent that the present invention can be carried out without those specified subject matter. Also, well-known functions or constructions are not described in detail, since they would obscure the invention in unnecessary detail.

Referring to FIG. 1 illustrating the structure of an optical recording/reproducing apparatus according to an embodiment of the present invention, the optical recording/reproducing apparatus includes a digital recording signal processor 30a, a channel bit encoder 40, an optical driver 50, a pickup 15, a drive 80, a radio frequency (R/F) part 60, a servo part 70, a digital reproducing signal processor 30b, and a microcomputer (micom) 100.

The digital recording signal processor 30a converts input digital data into a recording format by adding an error correction code (ECC) and outputs the converted data. The channel bit encoder 40 reconverts the converted data of the recording format into a bit stream and outputs the bit stream.

The optical driver 50 outputs a luminosity driving signal corresponding to the input signal. The pickup 15 records a signal to an optical recording medium 10 according to the luminosity driving signal output from the optical driver 50 and detects a signal from a recording surface. The drive 80 drives the pickup 15 and a motor (M).

The R/F part 60 filters and shapes the signal detected by the pickup 15 and outputs a binary signal. The servo part 70 controls the operation of the drive 80 through a tracking error (TE) signal and a focusing error (FE) signal of the pickup 15 and a rotation speed of the optical recording medium 10.

The digital reproducing signal processor 30b restores the binary signal to the original data according to its own clock which is synchronized with the binary signal supplied to the R/F part 60. The micom 100 controls the overall operation of the optical recording/reproducing apparatus.

Figure 2:
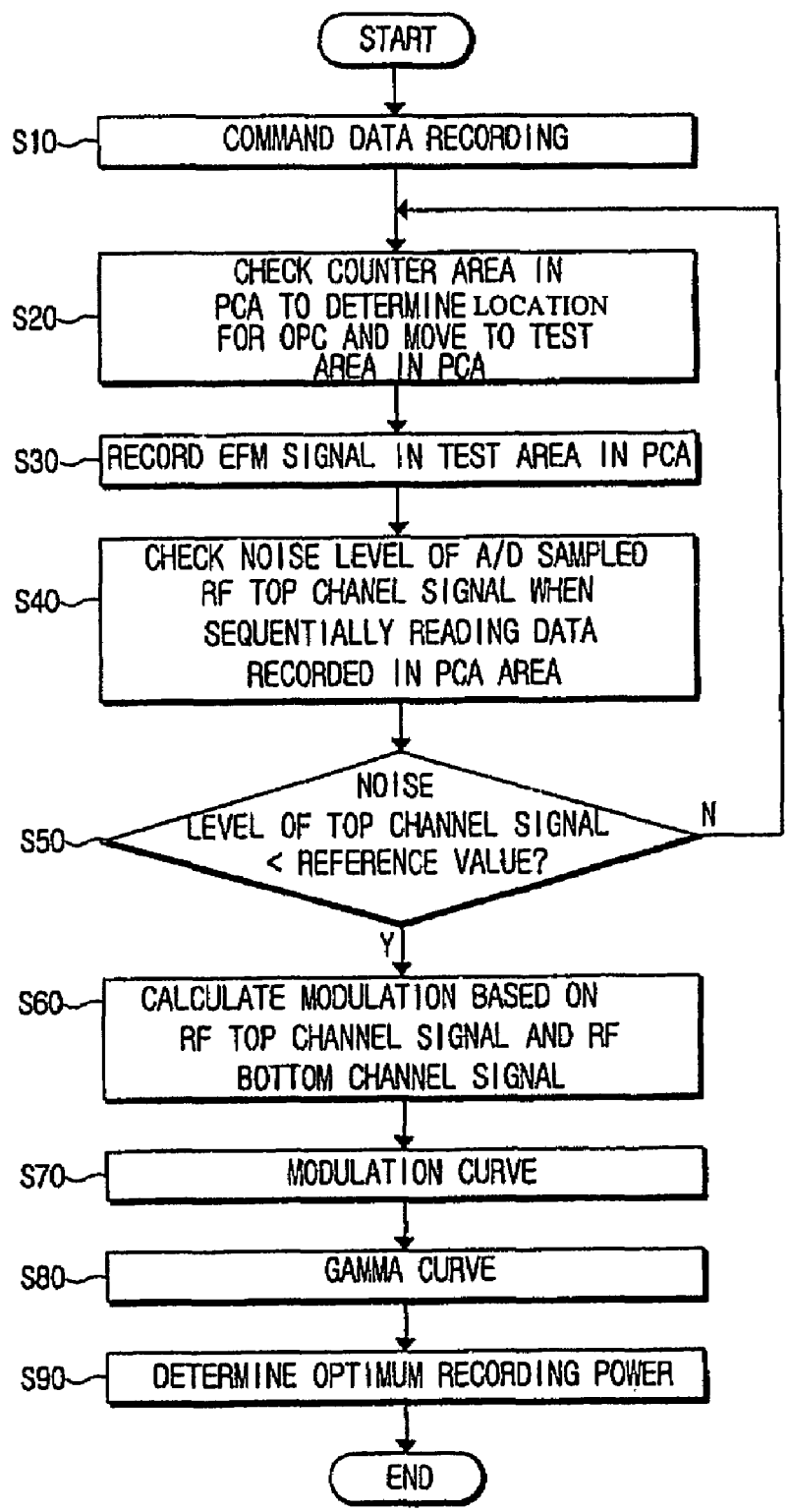
FIG. 2 is a flowchart for explaining a method for determining optimum recording power based on an interpretation of a gamma curve, according to an embodiment of the present invention.

FIG. 2 is a flowchart for explaining a method for determining optimum recording power based on an interpretation of a gamma curve, according to an embodiment of the present invention.

Referring to FIGS. 1 and 2, the optical recording medium 10 is inserted into a tray (not shown). Then, the optimum recording power detection is performed upon a command for recording data externally input through the micom 100 (S10). The processes for detecting the optimum recording power will be described as follows.

When the data recording is commanded (S10), the micom 100 checks a counter area in the PCA of the optical disc through the pickup 15 before recording the input data, thereby determining a location for performing optimum power control (OPC), and moves the pickup 15 to a test area in the PCA (S20).

The PCA, being set in the innermost circumference of the optical disc, includes an optical disc area and the counter area. The test area consists of a hundred partitions, and each partition includes sixteen sectors. One partition is used for one OPC process. The sixteen sectors of one partition are recorded with test signals of sixteen levels of laser power, respectively.

The micom 100 reads absolute time in pregroove (ATIP) information recorded on the optical recording medium 10 and records a random signal or an eight to fourteen modulation (EFM) signal in the test area of the PCA by dividing a laser recording power into sixteen levels based on a power reference recommended by the disc manufacturer (S30).

The micom 100 controls the pickup 15 to read, in regular sequence, the test data repeatedly recorded in the PCA and performs analog/digital sampling with respect to a top channel signal and a bottom channel signal as sequentially read and filtered by the R/F part 60. The top channel signal refers to a signal having a maximum level of luminosity, and the bottom channel signal refers to a signal having a minimum level of luminosity, among the signals filtered by the R/F part 60.

Then, a noise level of the sampled top channel signal is checked (S40). When the noise level of the sampled top channel signal is greater than a preset reference value (S50), it is determined that an error has occurred in the optimum recording power detection. Therefore, the area in the PCA wherein the OPC is currently performed is abandoned, and the OPC is performed from operation S20 again in a new area in the PCA.

If the noise level of the sampled top channel signal is smaller than the present reference value (S50), it is determined that the optimum recording power detection is being normally performed, so that a modulation factor is calculated based on the top channel signal and the bottom channel signal (S60). The calculation of the modulation factor can be achieved by [Equation 1] as follows:

$$m = \frac{|\text{Top}| - |\text{Bottom}|}{|\text{Top}|} \qquad \text{[Equation 1]}$$

wherein, 'm' denotes the modulation factor, |Top| denotes a size of the sampled top channel signal and |Bottom| denotes a size of the sampled bottom channel signal.

A polynominal expression with respect to a modulation factor curve (m=f(p)) is estimated through a curve fitting from the modulation factor at the respective recording optical powers calculated at operation S60 (S70).

The gamma curve is obtained from the estimated modulation factor curve (m=f(p)) (S80). The gamma curve refers to a regular slope of a function 'm' and is expressed by [Equation 2] as follows:

$$\gamma = \frac{dm}{dPw} \frac{Pw}{m} \qquad \text{[Equation 2]}$$

Referring to [Equation 2], m denotes modulation factor, γ denotes a modulation change and a recording power change, and Pw denotes a recording power recorded in the test area.

The optimum recording power ($P_o$) is determined by multiplying a recording power ($P_{target}$) corresponding to a gamma target ($\gamma_{target}$) already determined in the gamma curve, by a multiplication factor ρ (S90).

$$P_o = \rho \times P_{target} \qquad \text{[Equation 3]}$$

The gamma target ($\gamma_{target}$) and the multiplication factor ($\rho$), as well as the power reference, are predetermined when manufacturing the disc and encoded in the ATIP information in the lead-in area. The gamma target ($\gamma_{target}$) and the multiplication factor ($\rho$) may vary according to a type of the disc and a manufacturer thereof.

The optimum recording power calculated by [Equation 3] is set as the recording power to be used when recording the signal. That is, the micom 100 controls the optical driver 50 so that the recording signal with respect to the input data can be output by the optimum optical driving power detected through the above processes. The optical driver 50 applies the signal by the optimum optical driving power to the pickup 15, so that the signal modulated in pulse width can be recorded in the optical recording medium 10.

Also, when recording the data, the micom 100 determines a type of the recording signal, that is, a level and a width of the pulse based on the recording method recorded in the optical recording medium 10. The recording method is determined as a default value fixed in manufacturing. In case of the WORM optical recording medium, a log value is fixed according to a type of the recording medium while in case of RW optical recording medium, a log value is fixed according to a recording speed of the recording medium. Therefore, the data can be converted to the recording signal, that is, to the recording pulse using the optimum recording power calculated with reference to the type of the recording signal, and recorded to the optical recording medium 10.

As can be appreciated from the above, according to an embodiment of the present invention, whether the top channel signal is correct can be easily detected, so that the OPC is re-performed if necessary, and a correct determination of the optimum recording power is enabled.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for determining optimum recording power through detecting whether a radio frequency (RF) top channel signal is correct, the method comprising:
    determining a certain location for performing optimum power control (OPC) by checking a counter area in a power calibration area (PCA) in an optical recording medium, and recording a signal in a test area in the PCA;
    performing analog/digital sampling with respect to an RF top channel signal and an RF bottom channel signal which are generated while reading test data repeatedly recorded in the PCA in regular sequence, and checking a noise level of the sampled RF top channel signal; and
    determining that an error has occurred in detecting the optimum recording power to therefore abandon a certain area of the PCA wherein the OPC is being performed when the noise level of the RF top channel signal is greater than a preset reference value, and re-performing the OPC in a new area.

2. The method of claim 1, further comprising:
    calculating modulation based on the top and the bottom channel signals when the noise level of the RF top channel signal is smaller than a preset reference value;
    estimating a modulation factor curve through a curve fitting from the modulation factor; and
    calculating a gamma curve from the modulation factor curve and determining the optimum recording power using the gamma curve.

3. The method of claim 1, wherein the signal is an eighteen to fourteen modulated signal.

4. The method of claim 1, wherein the signal is a random signal.

5. The method of claim 1, wherein the RF top channel signal has luminosity of a highest level, among the RF signals.

6. The method of claim 1, wherein the RF bottom channel signal has luminosity of a lowest level, among the RF signals.

7. The method of claim 2, wherein the modulation factor is calculated by a following equation:

$$m = \frac{|\text{Top}| - |\text{Bottom}|}{|\text{Top}|}$$

wherein, 'm' denotes the modulation factor, |TOP| denotes a size of the sampled top channel signal and |Bottom| denotes a size of the sampled bottom channel signal.

8. A method for determining recording power, the method comprising:
    determining a location for performing optimum power control (OPC) by checking a counter area in a power calibration area (PCA) in an optical recording medium;
    recording a signal;
    performing analog/digital sampling with respect to an RF top channel signal and an RF bottom channel signal of the recorded signal;
    checking a noise level of the sampled RF top channel signal; and
    determining that an error has occurred in detecting the recording power to therefore abandon an area of the PCA, wherein the OPC is being performed when the noise level of the RF top channel signal is greater than a preset reference value.

9. The method of claim 8, the further comprising:
    re-performing the OPC in a new area.

10. The method of claim 8, wherein the recorded signal is an eight to fourteen modulated signal (EFM) in a test area in the PCA.

11. The method of claim 8, further comprising:
    recording a random signal in a test area in the PCA.

12. The method of claim 8, wherein the RF top channel signal and the RF bottom channel signal are generated while reading test data repeatedly recorded in the PCA in regular sequence.

13. The method of claim 8, further comprising:
    calculating modulation based on the top and the bottom channel signals when the noise level of the RF top channel signal is smaller than a preset reference value;
    estimating a modulation factor curve through a curve fitting from the modulation factor; and
    calculating a gamma curve from the modulation factor curve and determining the optimum recording power using the gamma curve.

14. The method of claim 8, wherein the RF top channel signal has luminosity of a highest level, among the RF signals.

15. The method of claim 9, wherein the RF bottom channel signal has luminosity of a lowest level, among the RF signals.

16. The method of claim 12, wherein the modulation factor is calculated by a following equation:

$$m = \frac{|\text{Top}| - |\text{Bottom}|}{|\text{Top}|}$$

wherein, 'm' denotes the modulation factor, |Top| denotes a size of the sampled top channel signal and |Bottom| denotes a size of the sampled bottom channel signal.

\* \* \* \* \*